(12) United States Patent
Lohberg

(10) Patent No.: US 6,823,725 B2
(45) Date of Patent: Nov. 30, 2004

(54) LINEAR DISTANCE SENSOR AND THE USE THEREOF AS ACTUATOR FOR MOTOR VEHICLES

(75) Inventor: Peter Lohberg, Friedrichsdorf (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 171 days.

(21) Appl. No.: 10/181,068

(22) PCT Filed: Dec. 12, 2000

(86) PCT No.: PCT/EP00/12555
§ 371 (c)(1),
(2), (4) Date: Jul. 12, 2002

(87) PCT Pub. No.: WO01/51893
PCT Pub. Date: Jul. 19, 2001

(65) Prior Publication Data
US 2003/0000307 A1 Jan. 2, 2003

(30) Foreign Application Priority Data

| Jan. 13, 2000 | (DE) | ......................................... | 100 01 022 |
| Mar. 2, 2000 | (DE) | ......................................... | 100 10 042 |

(51) Int. Cl.[7] .............................................. G01L 3/26
(52) U.S. Cl. ................ 73/116; 324/207.13; 324/207.24
(58) Field of Search ........................ 73/116; 324/207.2, 324/207.13, 207.21, 207.24

(56) References Cited

U.S. PATENT DOCUMENTS

| 4,124,814 | A | * | 11/1978 | Lauerman ................ 324/207.2 |
| 4,712,083 | A | | 12/1987 | Heck et al. |
| 4,936,148 | A | * | 6/1990 | Shaw et al. .................... 73/728 |
| 5,929,631 | A | | 7/1999 | Striker et al. |
| 6,057,682 | A | * | 5/2000 | McCurley et al. ..... 324/207.23 |
| 6,215,299 | B1 | * | 4/2001 | Reynolds et al. ......... 324/207.2 |
| 6,316,939 | B1 | * | 11/2001 | Nakagawa et al. ......... 324/253 |
| 6,356,072 | B1 | * | 3/2002 | Chass ...................... 324/207.2 |

FOREIGN PATENT DOCUMENTS

| DE | 43 09 881 | 5/1994 |
| DE | 43 27 047 | 2/1995 |
| DE | 196 12 422 | 10/1997 |
| DE | 196 48 335 | 6/1998 |
| DE | 197 01 069 | 7/1998 |
| DE | 197 12 829 | 10/1998 |
| DE | 197 24 388 | 12/1998 |
| DE | 198 00 805 | 7/1999 |
| WO | 94/07037 | 3/1994 |
| WO | 97/42508 | 11/1994 |
| WO | 95/17680 | 6/1995 |
| WO | 97/46815 | 12/1997 |

OTHER PUBLICATIONS

Search Report of German Patent Office for Appln 10010042.2.

* cited by examiner

Primary Examiner—Edward Lefkowitz
Assistant Examiner—Jermaine Jenkins
(74) Attorney, Agent, or Firm—Honigman Miller Schwartz & Cohn LLP

(57) ABSTRACT

The present invention relates to a linear distance sensor for motor vehicles which comprises a displaceable element and a stator. The displaceable element includes a magnetic encoder. Sensor modules that operate according to the AMR principle, GMR principle, or Hall principle are linked stationarily to the stator. The displaceable element is guided by way of a bearing that is connected to the stator and embraces and axially guides the displaceable element. The sensor module(s) is/are linked stationarily to the stator. The field-generating means is/are positively connected to the displaceable element along the longitudinal axis of the displaceable element. The present invention further relates to the use of the linear distance sensor for measuring the pedal or lever position in an actuating device for brakes of motor vehicles.

13 Claims, 10 Drawing Sheets

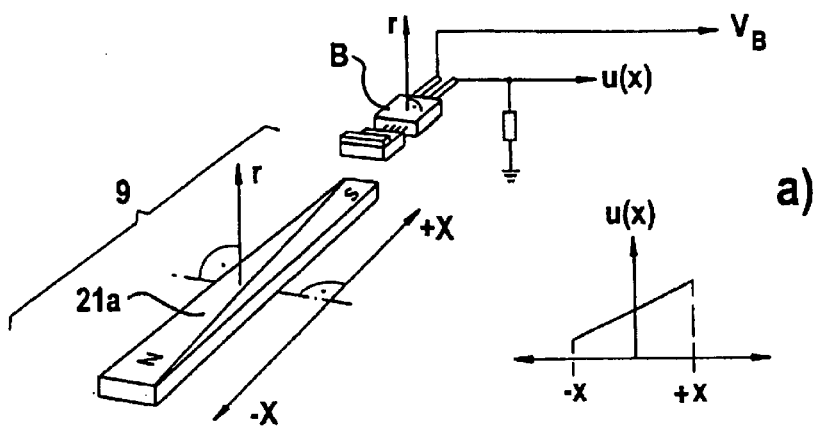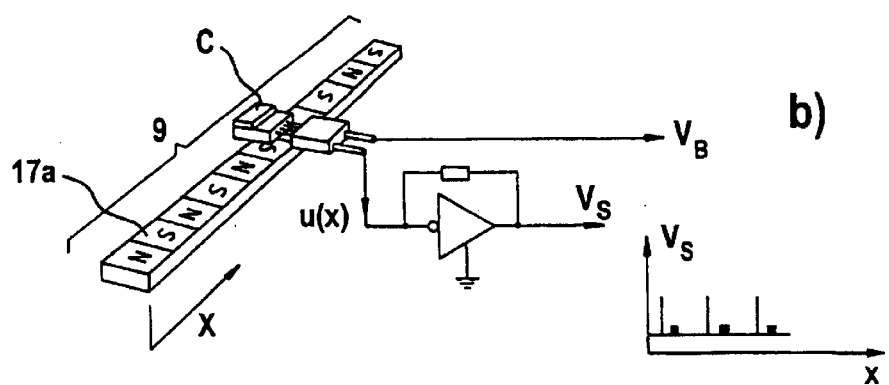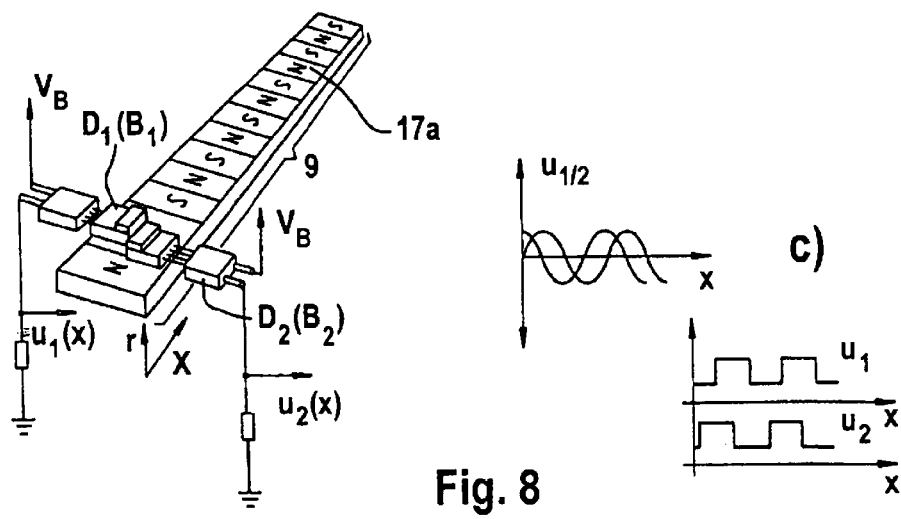
Fig. 8

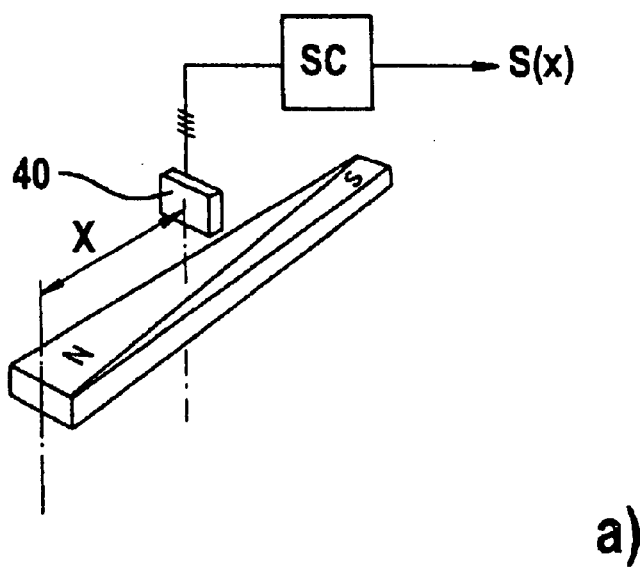
a)
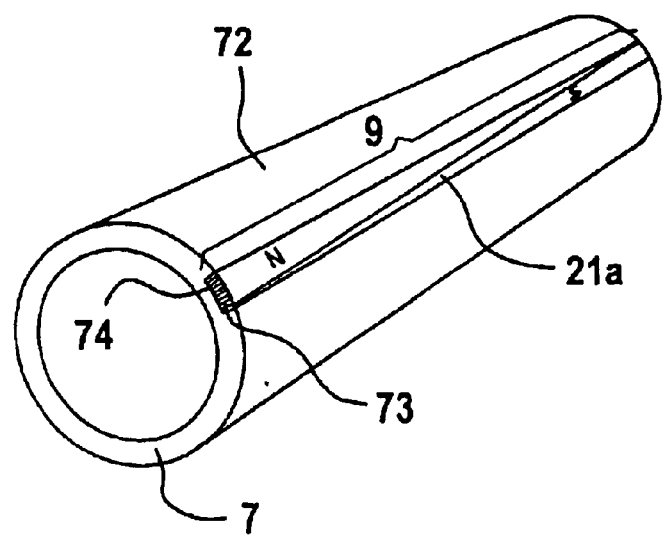
Fig. 9

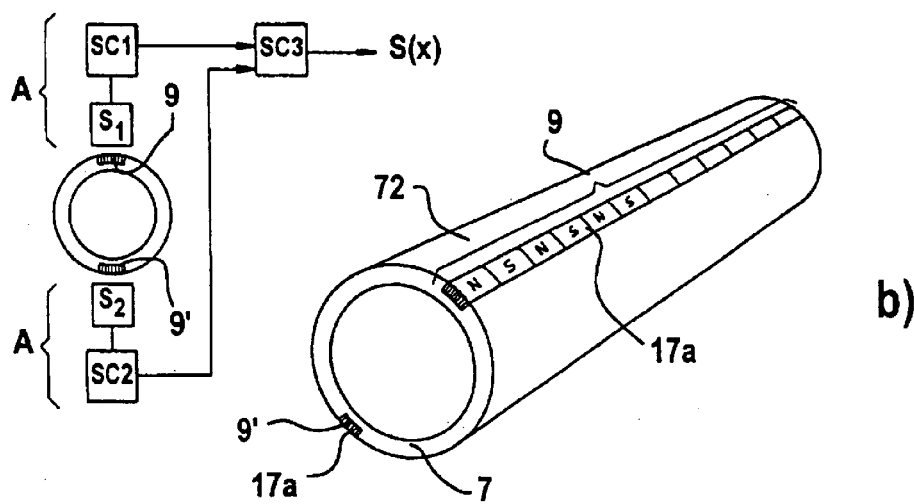
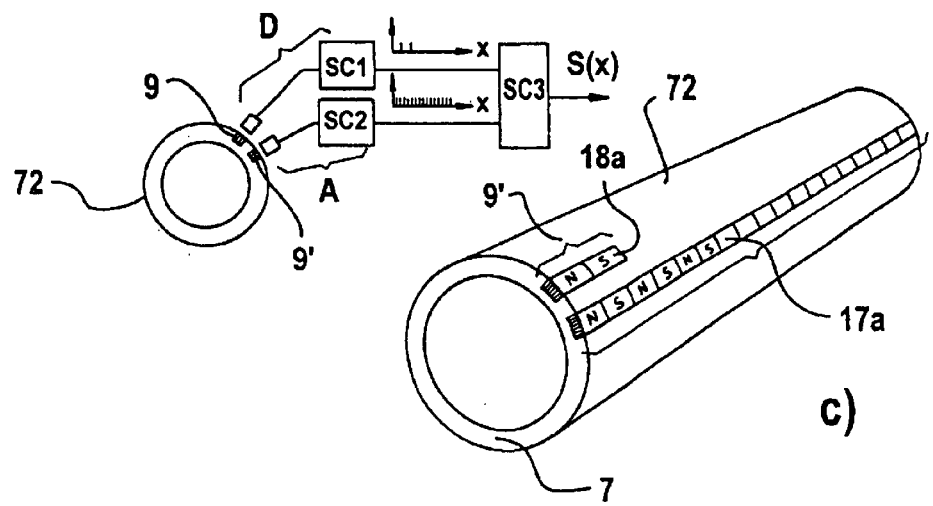
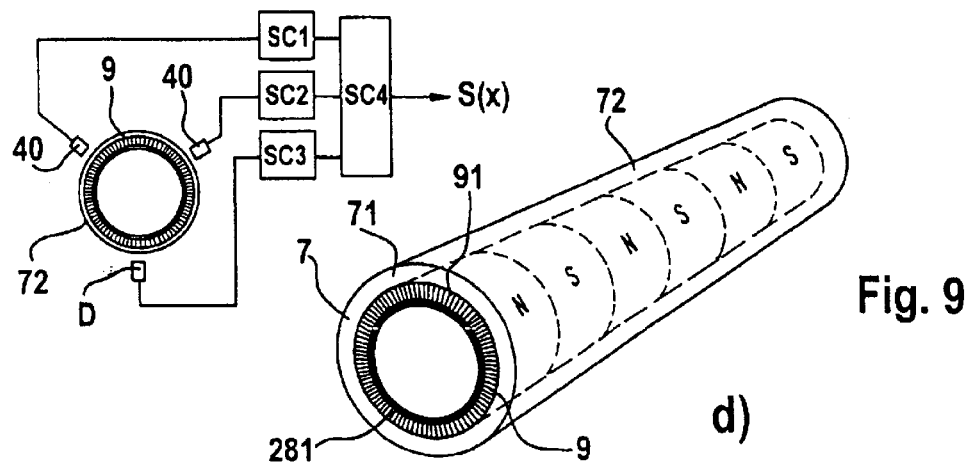
Fig. 9

LINEAR DISTANCE SENSOR AND THE USE THEREOF AS ACTUATOR FOR MOTOR VEHICLES

TECHNICAL FIELD

The present invention generally relates to actuators, and more particularly relates to a linear distance sensor.

BACKGROUND OF THE INVENTION

It is known in the art to determine the position and angular speed of e.g. vehicle wheels by means of arrangements comprised of magnetically coded discs or rings and magnetic field sensors. For this purpose, permanent-magnetic material is fitted to the coded discs or rings (so-called encoders). A variation of the magnetic field on the encoder is required to have the position determined by the sensors. This is done either by alternating the north-south magnetization of the magnetic material along a circle arc on the encoder, or by a periodically reduced distance of the magnetic material from the sensor. The magnetic field is now scanned along the circle arc by a magnetic field sensor, which may e.g. be a Hall sensor or a magneto-resistive resistor, in order to determine the wheel position and the angular speed e.g. by counting the signal edges of the sensor signal. The signal produced by the sensor can be amplified and triggered by an electronic circuit fitted in the area of the sensor or integrated in the sensor (active magnetic field sensor).

A comparable arrangement is described in WO 95/17680, but also in WO 97/42508 for determining the wheel condition in a motor vehicle.

U.S. Pat. No. 4,712,083 discloses a magnetic distance sensor of high resolution which likewise uses the principle of the rotating permanent-magnetic encoder. The encoder is formed of evenly spaced hard magnets, and the magnetic field of all individual magnets is aligned towards the moving direction. The arrangement described is also provided exclusively to determine the position of rotating bodies.

To determine the slide controller position in a linear potentiometer, a slidable permanent magnet whose position is detected by means of a stationary gyromagnetic field sensor is used in DE 196 12 422. This type of sensor reacts especially sensitively to angular variations of the magnetic field.

A distance sensor to determine the position of a throttle valve in a motor vehicle is described in U.S. Pat. No. 5,929,631. In this arrangement, a Hall element is used as a magnetic field sensor or, what is preferred, a resistor element which makes use of the giant magneto-resistive effect (GMR). The said publication further mentions that the arrangement for position determination can be used for radial movements and for linear movements. The proposed solution resides in arranging a large number of magnetic sensors along the passage at a regular distance. In one embodiment, an arrangement is illustrated wherein eight GMR-sensors are arranged spherically on a rotating cylinder and, during the rotation, pass by a rod-shaped permanent magnet that is fixed to the inside of the cylinder jacket. This method of position determination is disadvantageous because a chain or matrix of individual sensors must be connected to an electronic evaluating circuit. Determining the position in this way is technically complicated and cost-intensive.

An increase in the resolution of magnetic distance sensors can be achieved according to DE 43 27 047 by anti-parallel aligning the hard magnets arranged on the encoder, on the one hand, and by employing two magnetic field sensors, on the other hand, which are arranged so as to be slightly offset laterally in the direction of the moving direction. The effect of outside disturbances can be further reduced by connecting several magneto-resistive deposit-film resistors to provide Wheatstone bridges. The arrangement described permits being generally used for measuring circular or linear changes in position of two objects that are movable in relation to each other. The above publication, however, does not provide any hints how a distance sensing unit must be constructed under practically relevant conditions as they prevail e.g. in motor vehicles.

BRIEF SUMMARY OF THE INVENTION

In view of the above, an object of the present invention it to propose a linear distance sensor for motor vehicles which offers a maximum of reliability and a high distance resolution under conditions relevant in practice such as corrosion, wear, dirt, extreme heat, and extreme cold.

According to the present invention, this object is achieved by a linear distance sensor which is described in the following:

A linear distance sensor with an integrated magnetically effective component for e.g. mechanical actuation devices of brake units is described according to the present invention. Among others, the present invention is based on the idea of utilizing the mechanics of the actuation device additionally as the mechanics of non-contact linear distance indicators, the purpose of which is to depict the driver's request for actuation either weighted distance-proportionally or distance-responsively.

The magnetic field of the encoder is measured or sensed by one or more magnetic field sensors. The magnetic field is sensed by the magnetic field sensor either completely or only partially, while it is to be understood by partial sensing of the magnetic field under the present invention that of the measurement quantity entirely describing the magnetic field, such as field strength and direction of the field vector, not all the quantities are sensed by the sensor module(s), but e.g. only the field strength and two direction coordinates of the field vector in the x-y plane of an appropriately chosen system of coordinates.

The sensor module according to the present invention comprises at least one magnetic-field-sensitive sensor and, if necessary, an electronic circuit for further processing the sensor signal. The present invention may be implemented by magnetic-field-sensitive sensors that operate according to the XMR principle, preferably, the AMR (Anisotropic Magneto-Resistive) principle, the GMR (Giant Magneto-Resistive) principle, or the Hall principle.

AMR principle means that the sensor utilizes the anisotropic magneto-resistive effect. Corresponding sensors are e.g. disclosed in S. Mengel, 'Technologieanalyse Magnetismus Band 2: XMR-Technologien', section 2.2, pages 18 to 20, VDI Technologiezentrum Physikalische Technologien, Düsseldorf, 1997. GMR principle implies that the sensor element utilizes the 'Giant Magneto-Resistive Effect'. The Hall principle implies that the sensor utilizes the Hall effect. Preferably, exclusively sensors are employed which operate according to the AMR principle.

In a favorable aspect, the linear distance sensor according to the present invention is characterized in that the sensor module comprises a bridge circuit made of magnetic field sensors whose main plane is aligned in parallel to the surface normal and to the longitudinal axis of the displaceable element.

Under the present invention, the surface normal of the displaceable element means a directional vector that is vertical to the surface of the displaceable element.

If e.g. the displaceable element assumes the shape of a rod with a circular cross-section, the surface normal corresponds to the radius vector of the rod.

In a second favorable embodiment, the main plane of at least one sensor module with bridge circuit is aligned vertically to the surface normal of the displaceable element.

It is especially advantageous when both above-mentioned sensor variations are realized in the linear distance sensor of the present invention. In this function principle, different magnetic field components of a magnetic encoder track are used, and the field strength pattern of the encoder track is converted into different signals.

The output signal or the output signals of the magnetic sensors that contain data about the movement are preferably provided in an electrical form at the output. This signal can be conditioned by one or more sensor circuits and e.g. made available in a digitalized fashion at the output of the sensor circuit.

The means for producing the permanent course of lines of magnetic flux is also referred to as encoder in literature. It comprises, for example, either a permanent-magnetic material which was alternatingly magnetized along its longitudinal axis or at least two series-arranged magnetized permanent-magnetic materials that modulate the course of the lines of magnetic flux by a different orientation or intensity of magnetization of the magnetic material. Bipolar or multipolar permanent magnets may be used, for example. Encoders are preferably used which comprise a homogeneous magnetic material which was magnetized corresponding to the desired course of lines of magnetic flux.

The permanent-magnetic material is aligned especially anti-parallel with respect to the magnetic north-south direction.

As permanent-magnetic material, e.g. permanent-magnetized ceramics material, for example, anisotropic barium ferrite magnets, is used, and plastics-bonded ferrite material is preferred. In a particularly favorable fashion, a material may be employed as a plastics-bonded magnetic material usable under the present invention which is utilized, for example, for manufacturing magnetized wheel bearing seals. This wheel bearing material is per se known and e.g. sold by the companies C. Freudenberg, Weinheim (Germany), SNR, Annecy (France), FAG Kugelfischer, Schweinfurt (Germany).

To improve the magnetic properties of the field-generating means, an iron return path may be provided on the backside. Preferably, an iron return path becomes unnecessary when permanent-magnetized ceramics material is used, however, it is expedient with plastics-bonded materials to arrange for a ferromagnetic return path. The iron return path is suitably composed of a magnetically conductive iron material that backs the field-generating means in the case of rod-shaped or ruler-shaped elements and forms a solid compound with it, what is especially preferred.

The shape of the field-generating means e.g. corresponds to that of a thin-walled tube, a narrow, flat ruler or that of a round rod. Preferred in use are field-generating means in the form of flat rulers with a spherical or trapezoidal profile, or round rods filled with an iron core.

The bearing guiding that guides in an axial direction is favorably so designed that the area of the field-generating means is sealed at least in part by the bearing itself. Additional sealing means in the area of the bearing becomes unnecessary in this case. It is especially advantageous when the sealing means itself performs the function of the bearing. The displaceable element is preferably comprised of a shank, an actuating element mechanically connected with the shank, and a force take-over means so that upon actuation of the actuating element by means of an outside force which acts upon the force take-over means, the shank and, thus, the field-generating means can be displaced axially in a way substantially free from tensile forces and/or pressure forces.

The displaceable element may have any cross-sectional shape desired and has either a massive design or an axial recess as it is e.g. provided in a tubular object.

Preferably, the displaceable element is a special section tube. According to the present invention, the term 'special section tube' refers to a conventional tube with any cross-section desired, e.g. round, oval, square, square with rounded edges, or polygonal.

The shank 7 may be of integral design or composed of several single parts. The connection between the shank and the actuating element is such that the shank is moved along with the rod in an exact manner in terms of position. Thus, the shank may be screwed to the actuating element.

Favorably, the cross-sectional shape of the shank generally corresponds to that of a special section tube as defined above, and the shank may additionally be hollow or solid. In a particularly favorable manner, however, the shank has an axial opening as it is typical of special section tubes.

The force take-over means for transmitting an outside force onto the actuating means e.g. serves to transmit the force of a brake pedal onto the brake cylinder. Preferably, the actuating means is a direct connection to the actuating rod of the brake cylinder or, in particular, is the rod itself. The force take-over means must generally be rated for forces in the direction of brake triggering, i.e., in the direction of the actuating rod, but it may also transmit forces under tensile stress, what is preferred. The force take-over means may be a rigid or movable connection to the brake pedal, preferably, a movable connection is concerned. The force take-over means is e.g. a ball-and-socket joint, a needle bearing, or a cone bearing.

The arrangement of the present invention for measuring linear distances favorably has a particularly low hysteresis.

A redundant arrangement according to the present invention refers to arrangements which are either fully redundant, partly redundant, or also comprise dually or multiply redundant systems so that in the event of failure or malfunction of a sensor or a sensor circuit, an element which exists twice will take over the function of the failing or faulty element, or detects malfunction thereof and, as the case may be, signals it to a monitoring device.

A specific resolution of the linear distance sensor is basically dependent on the qualities of the sensor and those of the field-generating means (encoder). For example, the variation of the magnetic field along the encoder (encoder track) can be varied by the distance of the single magnets, depending on the demands placed.

According to the present invention, linear distance-responsive magnetic codifications of the encoder track may be used, and also non-linear magnetic codifications. However, multi-track codifications may also be used, but preferably single-track codifications are employed, especially linear single-track codifications.

Another possibility includes designing the magnetic codifications so that, in interaction with appropriate sensors, an analog distance resolution is achieved which is much finer compared to a quantized distance resolution. In the practice, however, it is suitable to produce a quantization by a periodic repetition of a magnetization pattern so that a signal quantized in terms of distance prevails as an output signal.

The present invention also relates to the use of the above-described linear distance sensor for measuring the pedal position or lever position in an actuating device for brakes of motor vehicles.

Preferably, the linear distance sensor of the present inventions permits being used for piston shanks, actuating rods, throttle valves, and hydraulic pistons in motor vehicles.

BRIEF DESCRIPTION OF THE DRAWINGS

FIG. 8 are schematic views of examples of sensor/encoder combinations of the present invention with the sensor plane being aligned vertically to the surface normal r of the displaceable element.

FIG. 9a is an example for a combination of a combination made up of sensor and encoder according to the present invention, wherein the sensor plane is aligned in parallel to the surface normal r and vertically to the moving direction X of shank 7.

FIG. 9b is an example of a shank of the present invention with two embedded field-generating means.

FIG. 9c is a schematic view of an example for a shank of the present invention with two field-generating means, wherein one encoder does not cover the full length of the encoder.

FIG. 9d is a schematic view of an example of the present invention of a tubular shank with a radially symmetric field-generating means which is slid into the interior of the tube.

DETAILED DESCRIPTION OF THE PREFERRED EMBODIMENTS

Figure 1:
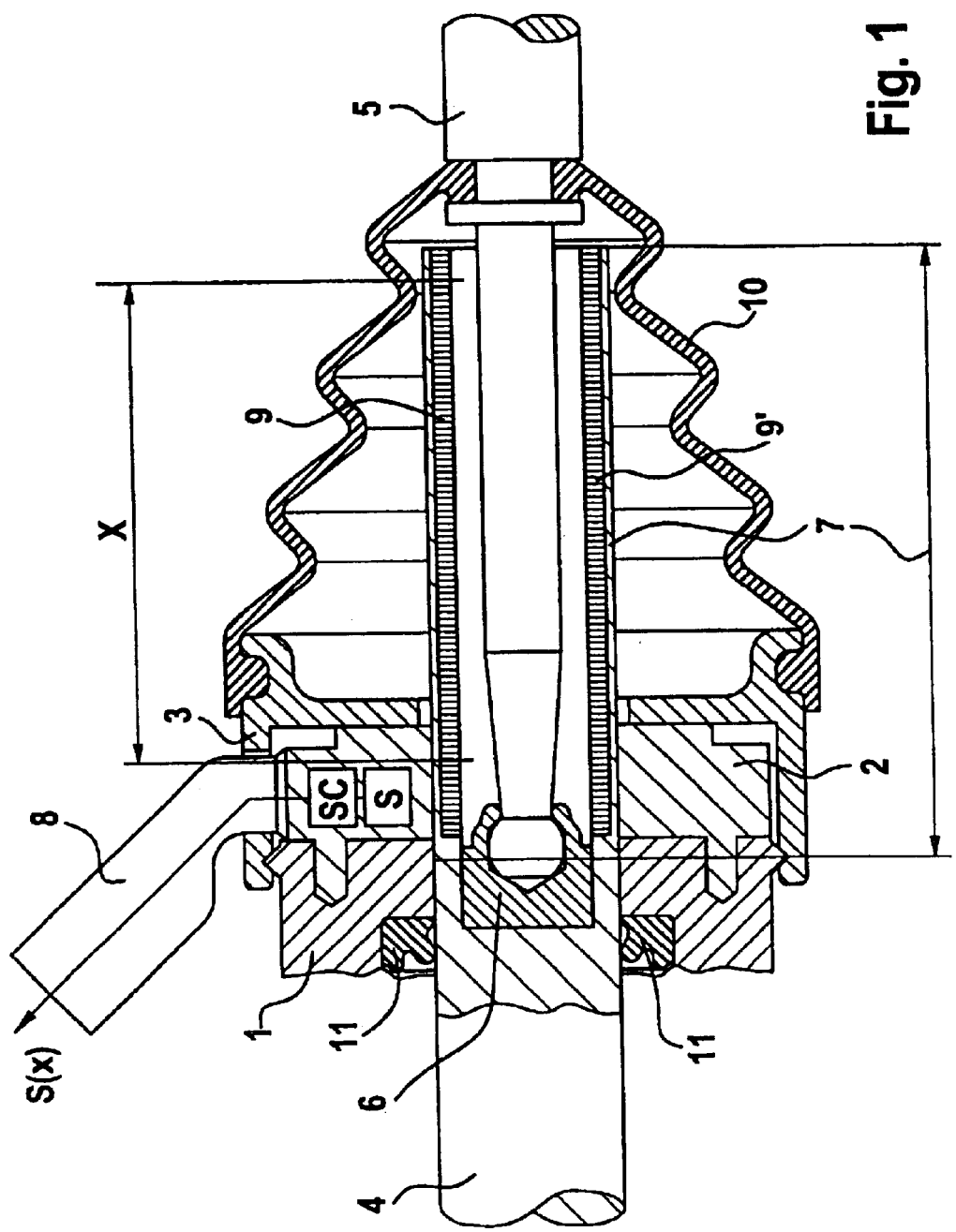
FIG. 1 is an example of a linear distance sensor which can be used in an actuation device for brakes of motor vehicles to sense the position of the pedal.

FIG. 1 shows the cross-section of an actuator, e.g. an actuating device for brakes, including the basic mechanical elements into which the mentioned magnetically effective components are integrated and with which they form the arrangement or device of the present invention. The components are a stator 1, 2, 3 and an actuating element 4 which is a rod, for example, which are displaced to and fro by the distance x in relation to each other during the actuating or resetting operation. In this example, the actuating element 4 is actuated by an outside force that acts on the actuating element, for example, by way of another rod 5, and both rods are mechanically coupled by way of a ball-and-socket joint 6. Rod 4 is mechanically coupled to a shank 7, and rod 4 and shank 7 may also be manufactured from one joint piece. In the present example, the shank is configured as a tube. The manufacture from one piece and partial design as a tube is preferred in this arrangement. In this case, only the piece with a tubular design is referred to as shank. It is also possible according to the present invention to use a continuous rod 4 which accommodates the encoder(s). The cross-section of the rod 4 and the shank 7 and the opening cross-section of the stator 1, 2, 3 which comprises the rod are favorably of a circular design, although a circular cross section is not imperative. Thus, it is also possible to use cross-sections that are designed like a square, triangle, or trapeze or dovetail, respectively. Advantageously, the stator is a compound made up of several housing parts, but it may also be of integral design. The sensor carrier 2 in or on the sensor S is stationarily connected to the housing part 1, favorably, including associated integrated circuits for the purpose of signal conditioning SC which are embedded, clipped, screwed or form-locking clamped additionally. The sensor carrier preferably represents also the mounting support for a plug 8 or, alternatively, for a cable for the propagation of sensor signals S(x) representative of the displacement x to an electronic unit further processing the signals. Housing part 1 and sensor carrier 2 are favorably slipped onto each other in a non-rotatable manner. In the present example, sensor carrier 2 is press fitted on the housing part 1 by way of a resilient cap 3. However, it is also possible that the sensor carrier 2 is screwed, cemented or press fitted to the housing part 1 by any other resilient holding mechanism. It is especially favorable that there is a means which prevents twisting of the sensor carrier and the housing part.

The arrangement of the present invention is protected against dirt, humidity (corrosion), ferrous particles, small parts, etc. To this end, a sealing means 10 which is a rubber sleeve in this case is provided in the area of the shank between the housing and the rod 5. A seal 11 close to the rod also provides protection against contaminants.

FIG. 1 shows a variant that is especially favorable with respect to the shank/field-generating means (encoder). A tubular encoder (see FIG. 5, types 28a to 33a and 28b to 33b) is inserted into a tubular thin-walled shank 7. An iron return path may be employed advantageously also in this case. The advantage is that no magnetic attractive forces act on particles at the tubular encoder inside. The encoder is mechanically protected in the annular construction and the shank can be guided by way of a pressure-loaded seal.

Figure 2:
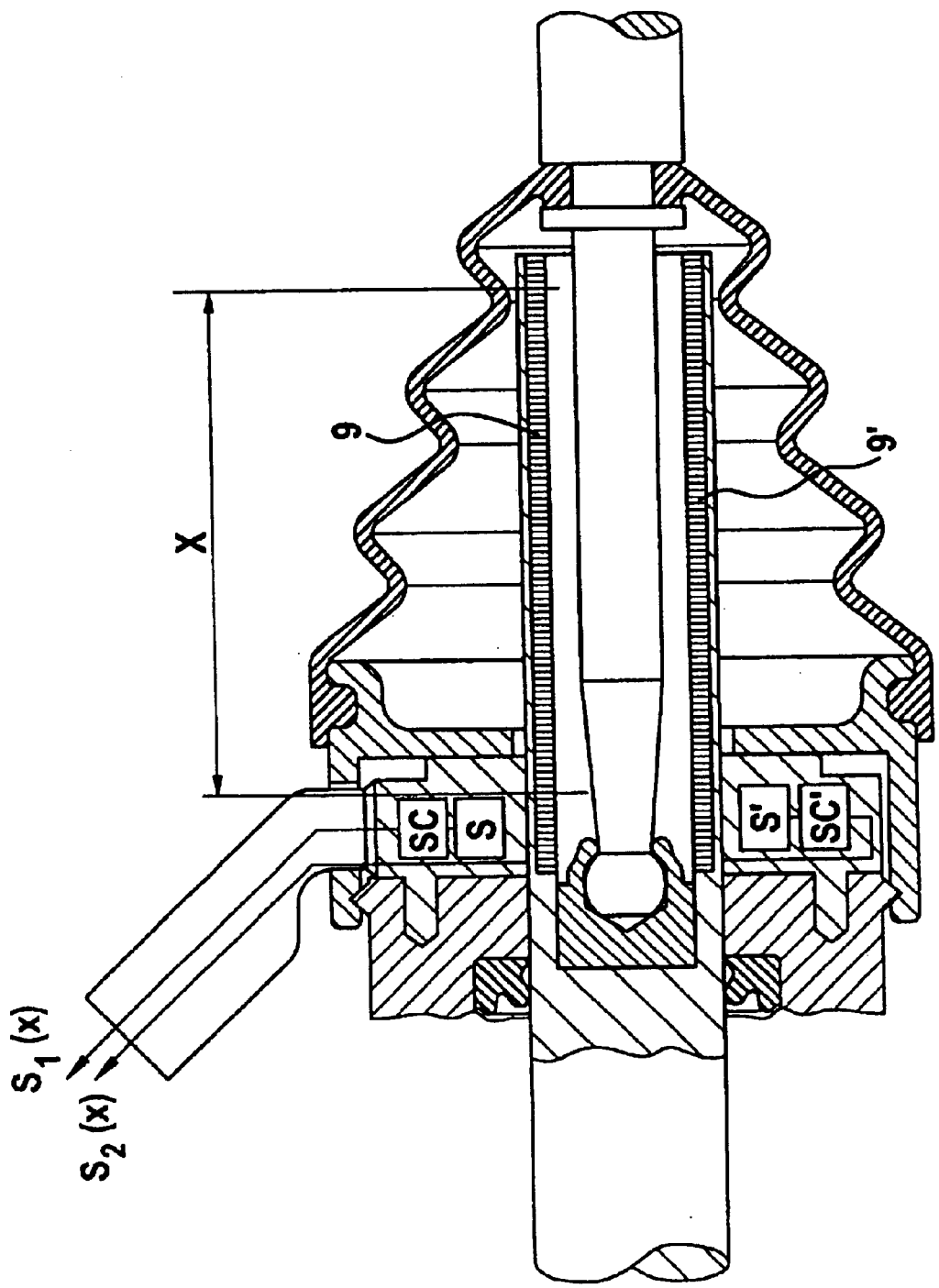
FIG. 2 is another example for a linear distance sensor according to FIG. 1 with two sensor modules (S, SC, S', SC').

A linear distance sensor largely corresponding to FIG. 1 is illustrated in FIG. 2. The arrangement has a simple redundant design in contrast to FIG. 1. Two sensors S, S' including sensor circuits SC, SC' respectively associated with the sensor are provided in the sensor carrier 2. Two encoders 9 and 9' are embedded in the shank. Position-synchronous signals S1(x) and S2(x) are produced by interaction of encoder, sensor, and sensor circuit.

Figure 4:
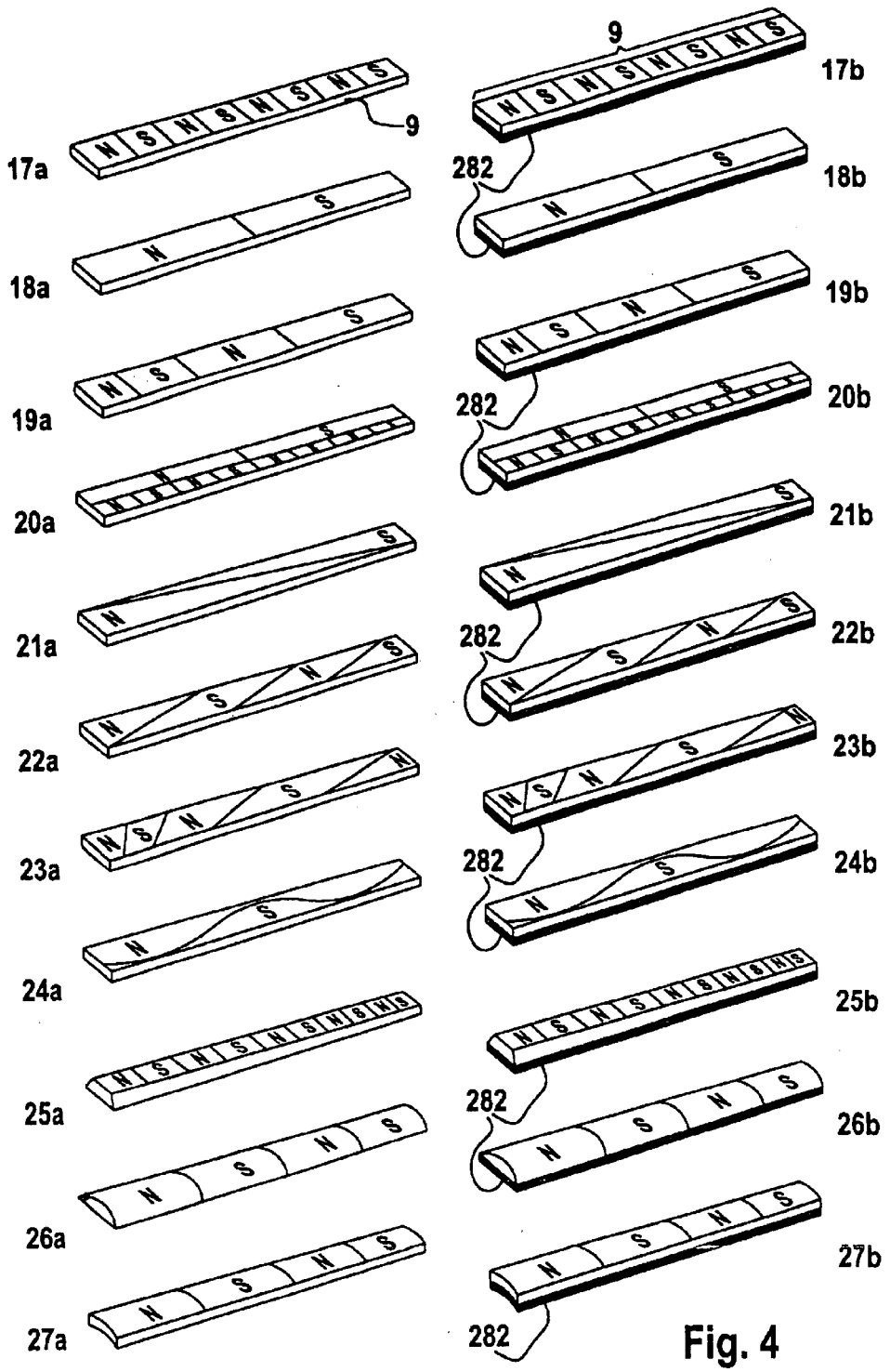
FIG. 4 shows examples for field-generating means that can be employed according to the present invention without magnetic return path (a) and with return path (b) for insertion into a recess of the displaceable element.
Figure 5:
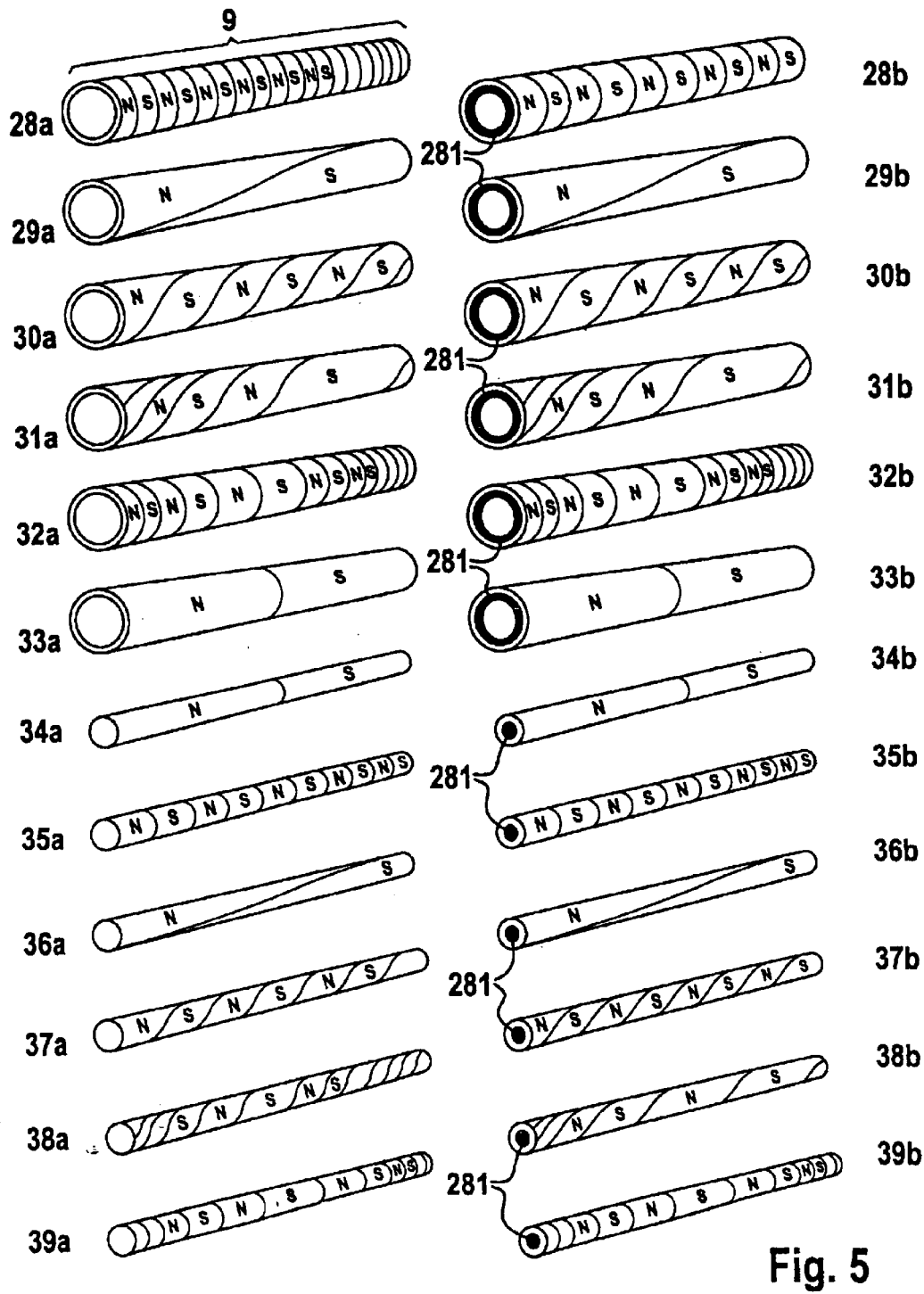
FIG. 5 shows examples for field-generating means that can be employed according to the present invention without magnetic return path (a) and with return path (b) for being slid into a bore or an axial opening of the displaceable element.

Further field-generating means according to the present invention are illustrated in FIGS. 4 and 5. Variants 17a to 39a are encoders without iron return path 281, 282, and variants 17b to 39b are encoders with iron return path 281, 282. In the case of tubular encoders, the iron return path is a thin inside tube, without an air slot towards the magnetic material. Preferably, this tube may additionally be a mechanical support for especially thin-walled tubes. With encoders shaped as a round rod, the iron return path is a wire-shaped iron core.

According to the present invention, the encoders can be provided with the examples of magnetization patterns listed hereinbelow:

A magnetic encoder period (illustrated in partial pictures 18a, 18b, 33a, 33b, 34a, 34b), Several magnetic equidistant encoder periods (illustrated in partial pictures 17a, 17b, 25a, 25b, 26a, 26b, 27a, 27b, 28a, 35b), Several magnetic non-equidistant encoder periods (illustrated in partial pictures 19a, 19b, 32a, 32b, 39a, 39b), Multi-track magnetic rulers (illustrated in partial pictures 20a, 20b), Individual linear magnetic pitch periods (illustrated in partial pictures 21a, 21b), Several linear magnetic pitch periods (illustrated in partial pictures 22a, 22b), Individual non-linear magnetic pitch periods (illustrated in partial pictures 24a, 24b), Several non-linear magnetic pitch periods (illustrated in partial pictures 23a, 23b), Screw lines with individual linear magnetic pitch period (illustrated in partial pictures 29a, 29b, 36a, 36b), Screw line with several linear magnetic pitch periods (illustrated in partial pictures 30a, 30b, 37a, 37b), Screw line with several non-linear magnetic pitch periods (illustrated in partial pictures 31a, 31b, 38a, 38b).

Figure 6:
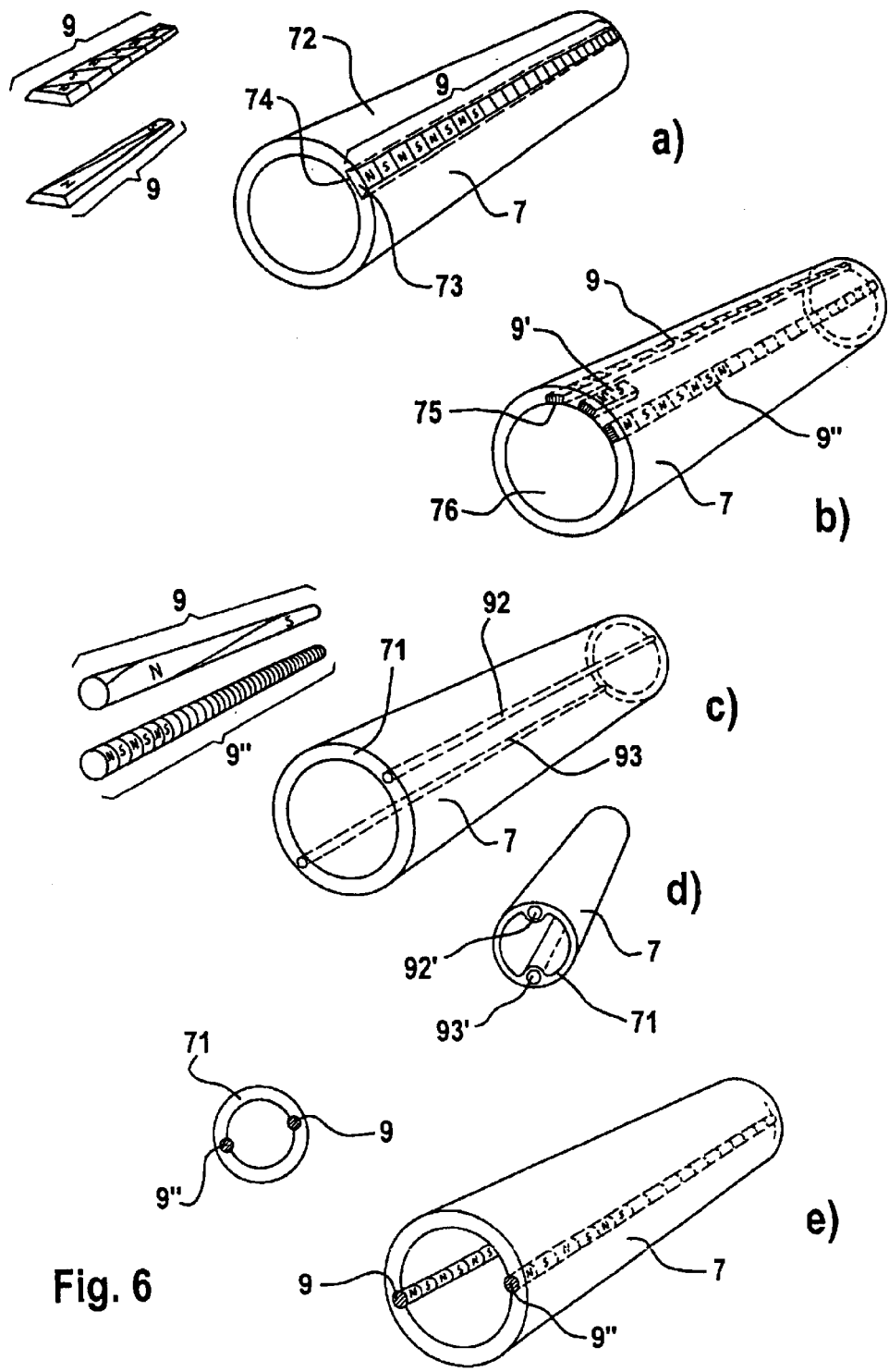
FIG. 6 shows further, also schematically illustrated examples for shanks 7 of the present invention along with insertable or inserted field-generating means 9, 9', 9".

Examples for encoder shanks are shown in FIG. 6. The material of shank 7 is desired to have a minimum possible magnetic conductivity as is e.g. the case in magnetically non-conductive steel or hard aluminum. The encoders 9, 9', 9" can be embedded in different regions 74, 75 of the shank body.

Partial picture a of FIG. 6 shows a tubular shank 7 having an outside periphery 72 wherein a ruler-shaped encoder 9 is embedded. The illustrated ruler is a ruler of the type 25a according to FIG. 4. The said has a trapezoidal profile and is thereby kept captive in the shank, provided the recess 74 has a matingly trapezoidal shape. Rulers with a rectangular profile (FIG. 4, e.g. type 17a) may also be embedded in the outside periphery. When there is integration into the outside periphery, it is especially favorable to provide the encoders with an iron return path.

Partial picture b of FIG. 6 shows another tubular shank having several encoders of different length embedded in the inside periphery. This variant is advantageous when the shank is guided by means of a pressure-loaded seal.

Partial picture c shows another tubular shank having in its wall bores 92, 93' into which rod-shaped encoders may be slipped. Advantageously, the encoder is completely protected mechanically in this case, and the shank can be guided by means of a pressure-loaded seal.

Partial picture d shows another shank which, compared to the embodiment in partial picture e, can be designed as a tube with very thin walls, while the wall thickness is locally reinforced to incorporate the bores.

Partial picture e in FIG. 6 shows another shank with the special feature that the bores of the wall are designed eccentrically, and the diameter of the bores is larger than the wall thickness of the shank. Favorably, this permits captively mounting encoders (e.g. types 34a to 39a and 34b to 39b) with a relatively large diameter and an accordingly higher magnetic field strength. This is e.g. the case if the radius and the residual wall thickness remaining after drilling are smaller than the wall thickness of the shank.

Figure 3:
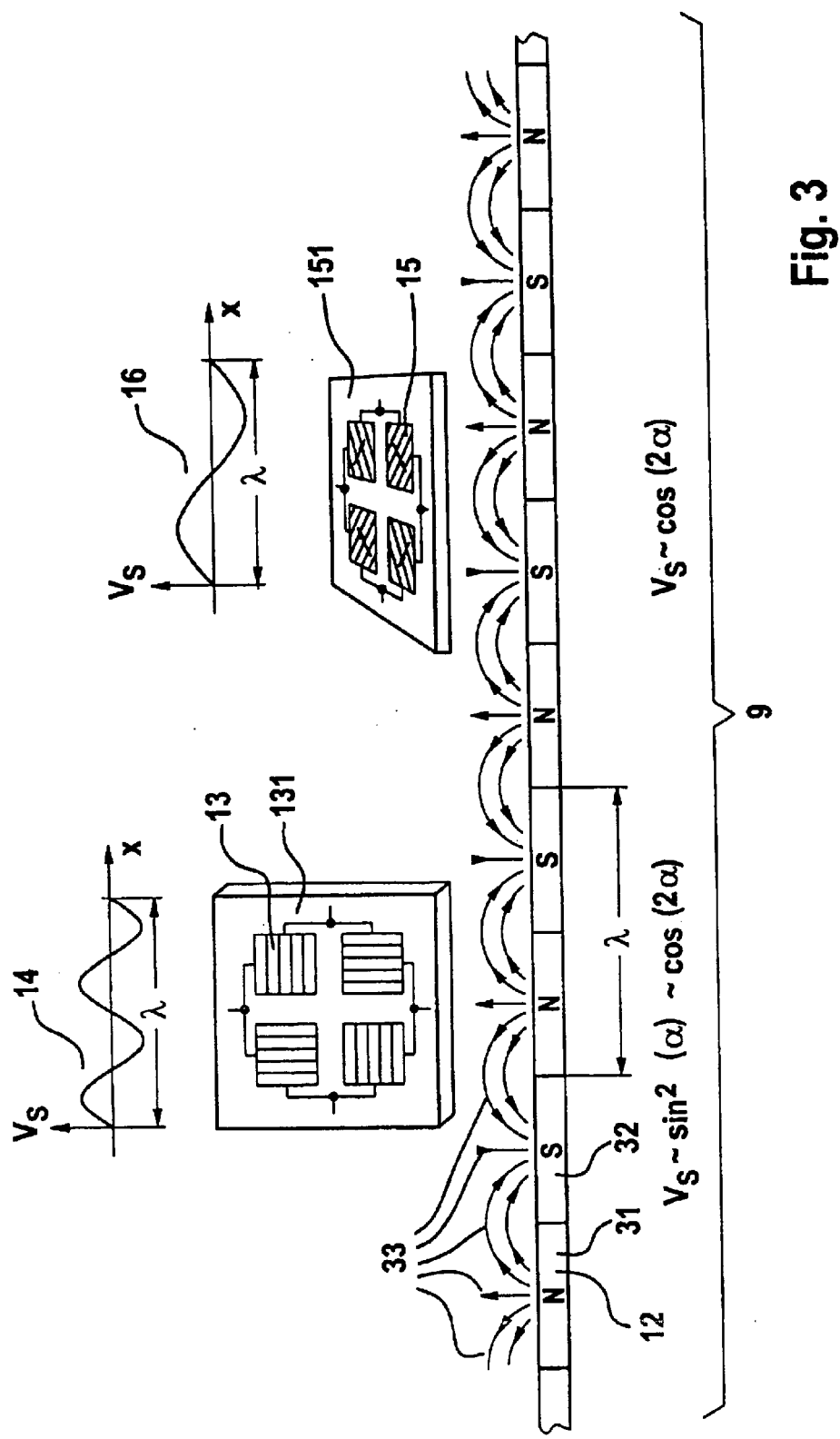
FIG. 3 is a schematic view of the course of lines of magnetic flux along the surface of an encoder in an axial direction along with differently oriented sensor modules and a graph showing the output signal of these sensor modules.

Sensor assemblies with a different orientation of the sensors with respect to the shank are illustrated in FIG. 3. Encoder 9 generates a periodic course of lines of flux 33 in the longitudinal direction of the encoder. The course of the lines of flux may also be referred to as encoder track. The illustrated course of the lines of flux is characteristic of magnetic material with zones 31, 32 of a homogeneous magnetic material, e.g. a ferrite, which are alternatingly magnetized in north/south-pole alignment. The encoder track extends two-dimensionally in the image plane. In the first variant illustrated in the left partial picture of the Figure, AMR sensors are connected in a bridge circuit 13, with the sensors all being placed in one joint plane 131. In the left partial picture, the plane is aligned vertically to the encoder plane, that is in parallel to the surface normal of the displaceable element and in parallel to the moving direction or the longitudinal axis of the displaceable element. In addition, the lamellar structure of the sensors in this orientation extends vertically or in parallel to the surface normal. When this structure is moved in the direction X along the encoder track, the vector of the magnetic field strength will rotate through the bridge plane, and the bridge produces an outlet signal with two signal periods 14 per encoder period $\lambda$. This effect will be referred to as $2\alpha$-effect hereinbelow.

In the right-hand partial picture, the joint plane of the bridge circuit is aligned in parallel to the encoder plane, that is, vertically to the surface normal of the displaceable element. When the displaceable element is moved in the direction X along the encoder track, only a partial vector of the magnetic field strength acts on the bridge layer so that an output signal is produced with only one signal period 16 per encoder period $\lambda$. This effect will be referred to as $1\alpha$-effect hereinbelow. Both effects can be converted into specific sensor elements which either are configured to detect a moving direction or to detect no moving direction. When the $2\alpha$-effect is used, the sensor elements especially include two bridges which are rotated by 45° in relation to each other and supply SIN/COS signals that permit deriving the moving direction according to known methods. In the $1\alpha$-effect, the phase shift of the bridge branches with respect to the encoder period $\lambda$ is used to detect the moving direction.

A particularly simple arrangement is achieved when employing only one of the sensor bridges of FIG. 3. In this case, however, the possibility of detection of the moving direction must be dispensed with.

When sensors are employed on the basis of the $2\alpha$effect, a high distance resolution may be achieved especially if per se known interpolation networks are inserted after the sensors and sensitively quantize the encoder period $\lambda$ and, thus, the distance x.

Figure 7:
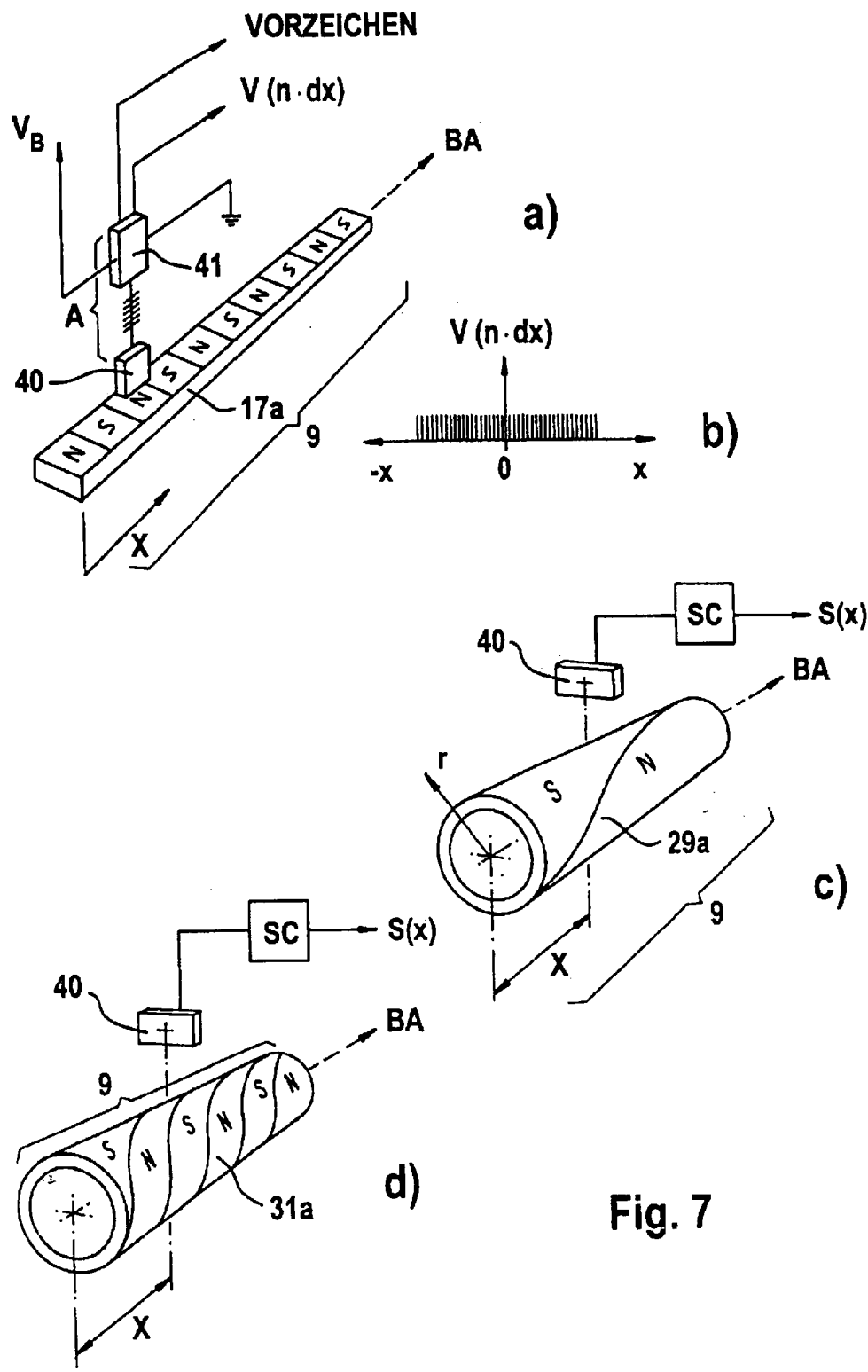
FIG. 7 is a schematic view of examples of combinations of sensors and field-generating means of the present invention with an illustration of the sensor electronics and an example for an output signal produced by the sensor electronics during movement of the field-generating means in the direction of the motional axis BA about the excursion x.

Examples for sensor/encoder combinations with a high position resolution are illustrated in FIG. 7. The sensors shown operate according to the AMR principle and utilize the principle of the $2\alpha$-effect. In partial picture a, the combination of a sensor 40 with an electronic network 41 connected downstream of the sensor is shown. The network serves for interpolation and signal conditioning. The network and the sensor are preferably integrated in one joint sensor assembly A. The network has an internal buildup so that an interpolation factor with a value of at least $(\lambda/8)/\Delta x$ is used, and $\Delta x$ corresponds to the distance increment with the minimum resolution. In partial picture a, the sensor plane of the sensor 40 is aligned in the direction of the moving direction X and in the direction of the surface normal of the encoder so that, with the encoder used, the field vector of the generated magnetic field rotates periodically through the plane of the AMR layer.

According to partial picture b, the sensor assembly A furnishes as a sign for the moving direction a binary signal and in the distance Δx an incremental signal pulse train V*(n*Δx).

In partial pictures c and d of FIG. 7, examples for sensor/encoder combinations are shown which are different from the embodiment illustrated in partial picture a with respect to the orientation of the sensor plane. The sensor plane is oriented vertically to the moving direction X herein, which is in contrast to partial picture a. The encoders of the type 29a or 31a illustrated herein generate a magnetic field which, similar to partial picture a, rotates through the plane of the AMR-layer.

Sensors 40 are connected with a component for the signal conditioning SC so that a position-variable signal S(x) is produced which corresponds in its effect to the signal of sensor A.

Examples for sensor/encoder combinations are shown in FIG. 8 which operate according to the 1α-effect by using the AMR principle. However, they generate different output signals at a like encoder.

Partial picture a shows a sensor assembly B in combination with an encoder of type 21a. When the sensor assembly B is displaced in a positive or negative X-direction, the sensor will react depending on the direction either with an increase or a decrease of the output signal. The analog signal can be quantized almost as sensitively as desired by way of an analog-digital converter in order to reach a high distance resolution. Partial picture b of FIG. 8 shows a sensor assembly C in combination with an encoder of type 17a. The output signal of the assembly is a pulse train having a frequency which corresponds to the number of the scanned poles of the encoder. A bit sequence with additional pieces of information is impressed between the pulses directly after a pulse, making use of the not required pulse pauses. It makes sense to configure the additional information so that the moving direction of the encoder may be taken from it.

Partial picture c shows an embodiment with two sensor assemblies of type D (reference numerals D1 and D2). However, sensor assemblies of type B may be used just as well (reference numerals B1 and B2). An appropriate encoder is e.g. one of type 17a. The components D1 (or B1) and D2 (or B2) are offset in position with respect to each other by half a pole width and generate two signals which are orthogonal relative to each other. SIN or COS signals are produced when two sensor assemblies of types B are used. The output signal can be converted into a high-resolution quantized position signal with direction information corresponding to the fashion described hereinabove with respect to FIG. 8 (2α-sensor). Square signals are produced when two sensors of type D are used, from which signals the direction information may be derived likewise in a similar manner. In this respect, however, the attainable position resolution of the total distance is limited to the number of poles.

Further examples for encoder/sensor combinations are shown in FIGS. 9a to 9d.

The shank 7 with embedded encoder 9 (type 21a) illustrated in FIG. 9a is combined with a 2αx sensor 40. The sensor's output signal is sent to an electronic circuit SC which generates the signal S(x).

FIG. 9b shows a shank 7 with two embedded encoders 9, 9' of type 17a. Sensor assemblies of type A which achieve high-resolution signals are referred to in this case. The said signals are then further processed in another electronic circuit SC3. The said circuit monitors the function of both sensor assemblies according to per se known redundancy principles and generates at the output the signal S(x) which is freed from disturbances, if any.

A shank 7 with two encoders of the type 17a and 18a with a different length is shown in FIG. 9c. Encoder type 17a is combined with a high-resolution sensor assembly of type A, and encoder type 18a is combined with a sensor assembly D of low position resolution. In the local area where both sensor assemblies are in the range of the respectively associated encoder (redundancy range) the sensor signals are processed in another electronic circuit SC3 in a per se known fashion according to redundancy principles to form an output signal S(x).

The embodiment in FIG. 9d shows a tubular shank with a likewise tubular encoder slipped into the shank, and the encoder has an iron return path with respect to type 28b. A redundant operation in connection with several sensors is this way especially simple. As sensors 40 two equal types with a high position resolution are apt for use, and as sensor D a type with a comparatively low position resolution is used. The sensors 40 along with the circuits SC1 and SC2 form sensor assemblies of the type A also in this arrangement. All three sensor signals are processed in an electronic circuit SC3 according to per se known redundancy principles to form an output signal S(x). The cylinder-symmetrical shape of the encoder shank is especially favorable because the sensors can be arranged at any desired angle at the periphery of the shank. Iron particles are prevented from adhering in the interior of the shank due to the iron return path.

The encoder of type 28b used is made of a plastics-bonded magnetic material.

The sensors or sensor assemblies which can be used according to the present invention are mainly commercially available. Examples for commercial sensors and sensor assemblies will be listed hereinbelow:

Angular sensor LK28, IMO Wetzlar (2α)
Angular sensor LK15, IMO Wetzlar (2α)
AMR bridge KMZB34, Philips Hamburg (1α)
ASIC UA1272, Philips Hamburg (1α)
Active wheel sensor OH223, Philips Hamburg (1α)
Active wheel sensor OH243, Philips Hamburg (1α)
Active wheel sensor OH191, Philips Hamburg (1α)
Active wheel sensor OH203, Philips Hamburg (1α)

All listed 1α types are offered with a uniform housing shape and have a two-wire connection. The output signal is available in the form of a current signal.

Some dimensional information with respect to the embodiments is specified in the following:

thickness of the magnetic film of the encoder:
>=1 mm (preferred: 0.2 to 4 mm)
length of an encoder:
54 mm (preferred: 10 to 100 mm)

Example for the Realization of a High Resolution in The Range of Roughly Δx=0.1 mm:

air slot (encoder/sensor element):
roughly 2 mm
(preferred: roughly 0.5 larger and roughly 5 mm smaller)
pole period λ:
6 mm (preferred: less than or equal 6 mm)
sensor element:
angular sensor LK28, IMO, Wetzlar (2α)
network:
eightfold interpolation network type 601.3028.02, IMO, Wetzlar Example for the Realization of a Resolution in the Range of Roughly Δx=2.0 mm:

air slot (encoder/sensor element):
  2 mm (preferred: roughly 0.5 to roughly 2.5 mm)
pole period λ:
  4 mm (preferred: 0.5 to 5 mm)
sensor element:
  active wheel speed sensor OH223, PHILIPS Hamburg (1α)

What is claimed is:

1. Linear distance sensor comprising:
   at least one axially displaceable element composed of at least one part and a stator,
   field-generating means with a permanently existing modulated course of lines of magnetic flux are arranged in the displaceable element, and
   one or more sensor modules stationarily connected to the stator and carry at least one magnetic field sensor wherein the one or more sensor modules convert the course of lines of magnetic flux generated by said field generating means completely or partially into output signals that can be further processed, wherein the magnetic field sensors operate either according to the AMR principle, the GMR principle, or the Hall effect principle,
   wherein the displaceable element is guided by means of a bearing connected to the stator and embracing the displaceable element at least partly and thereby guiding it axially,
   and wherein the one or more sensor modules are stationarily connected to the stator, and wherein field-generating means are positively connected to the displaceable element.

2. Linear distance sensor as claimed in claim 1, wherein a form-locking connection is established between the field generating means and the displaceable element by at least one of the following methods:
   fitting an elongate field-generating means into a recess on the surface of the displaceable element,
   using a special section tube with an axial recess and an inside surface, and fitting an elongate field-generating means into another recess which is provided on the inside surface,
   inserting a field-generating means into a bore that is arranged in the area of the periphery of the displaceable element and extends in parallel to the main axis of the displaceable element, or
   using a special section tube with an axial recess and with an outside peripheral area of the special section tube, and manufacturing an annular fit, with the field-generating means being slipped into the displaceable element, wherein it applies for all steps that the surface of the displaceable element is generally devoid of projections and indentations.

3. Linear distance sensor as claimed in claim 1, wherein the displaceable element includes a shank portion which carries the field-generating means, an actuating element mechanically connected to the shank, and a force take-over means so that upon actuation of the actuating element by means of an outside force which acts upon the force take-over means, the shank and, thus, the field-generating means is displaced axially in a way substantially free from tensile forces or pressure forces.

4. Linear distance sensor as claimed in claim 3, wherein a magnetic return path is integrated into the shank portion of the displaceable element.

5. Linear distance sensor as claimed in claim 3, wherein the shank is a cylinder-shaped tube, wherein the field generating means includes permanent-magnetic material having the shape of a cylinder-shaped tube, wherein the magnetic field along the longitudinal axis of the magnetic material is radially symmetrical, and the permanent-magnetic material is slipped into an axial recess of the shaft.

6. Linear distance sensor as claimed in claim 1, further including a sealing means which protect the field-generating means against contaminants and corrosion.

7. Linear distance sensor as claimed in claim 1, wherein the sealing means comprise pleated bellows, rubber sleeves, and slide seals.

8. Linear distance sensor as claimed in claim 1, wherein a stationary connection between the sensor modules and the stator is effected by a sensor carrier which is a component part of the stator and coupled to it in a mechanically detachable fashion.

9. Linear distance sensor as claimed in claim 1, wherein a redundant function is ensured by the arrangement of at least two magnetic field sensors in the linear distance sensor, wherein the at least two magnetic field sensors either tap the magnetic field of a joint field-generating means, or some or all sensors tap the magnetic field of a field-generating means respectively associated with a magnetic field sensor.

10. Linear distance sensor as claimed in claim 1, wherein a first of said at least two magnetic field sensors is arranged offset in an axial direction by up to a magnetic field period with respect to a second of said at least two magnetic field sensors so that the output signal of the second magnetic field sensor is phase-shifted by the output signal of the first magnetic field sensor.

11. Linear distance sensor as claimed in claim 1, wherein said at least one magnetic field sensor includes first and second magnetic field sensors, wherein said first magnetic field sensor has lower resolution ability compared to said second magnetic field sensor.

12. Linear distance sensor as claimed in claim 1, wherein at least one sensor module comprises a bridge circuit made up of magnetic field sensors having a main plane arranged in parallel to a surface normal and the longitudinal axis of the displaceable element.

13. Linear distance sensor as claimed in claim 1, wherein at least one sensor module comprises a bridge circuit made up of magnet sensors having a main plane is aligned vertically to a surface normal of the displaceable element.

* * * * *